Oct. 6, 1925.
J. G. STEPHENSON
1,556,173
TRACTOR PLOW
Filed Oct. 7, 1921
2 Sheets-Sheet 1
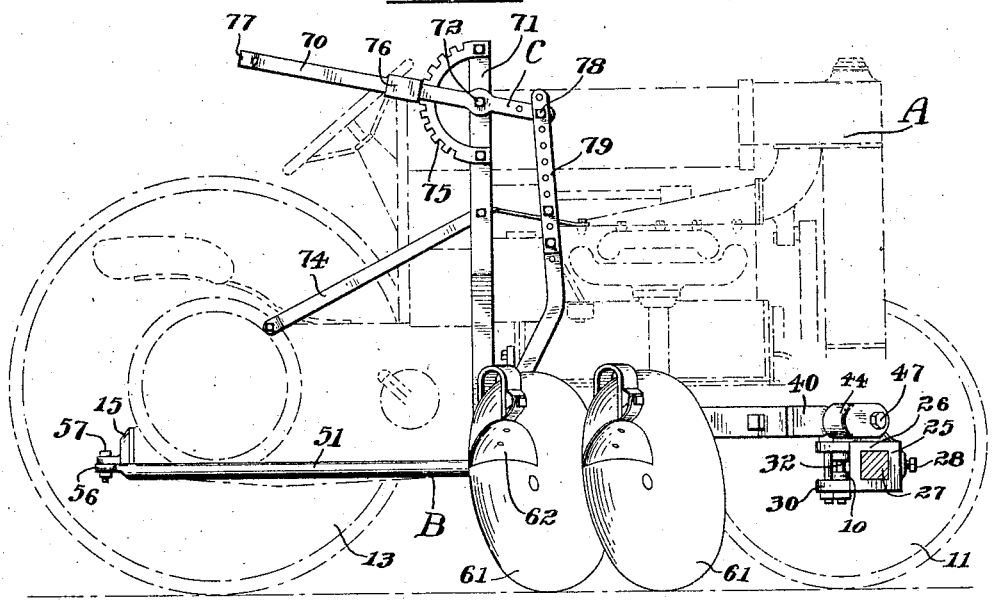
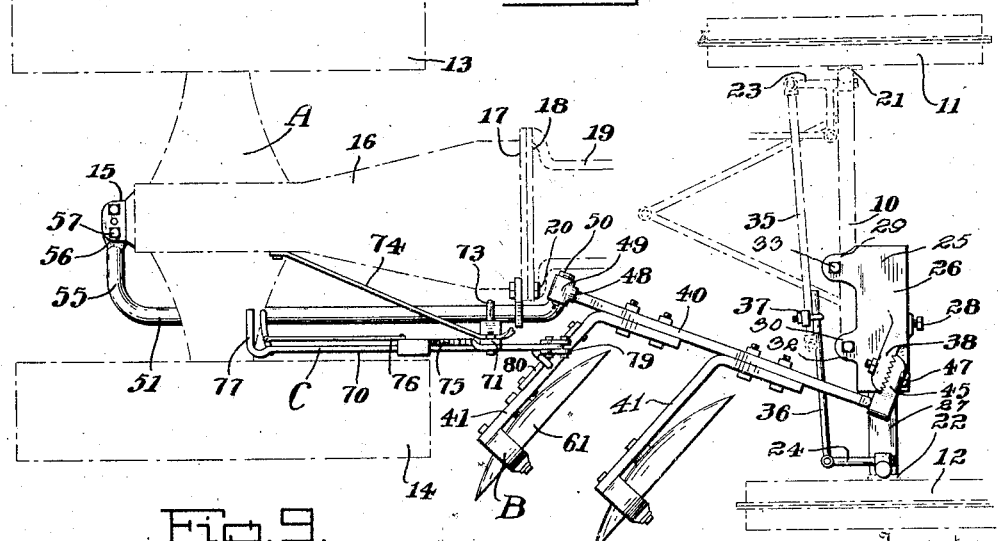
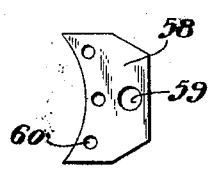
Inventor
Jay G. Stephenson.
By Lancaster and Allwine
Attorneys

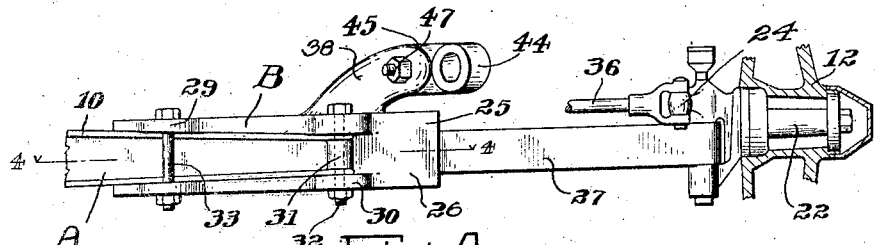
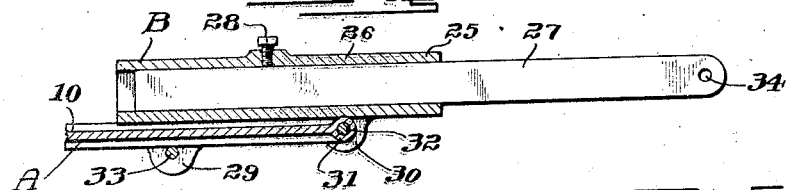
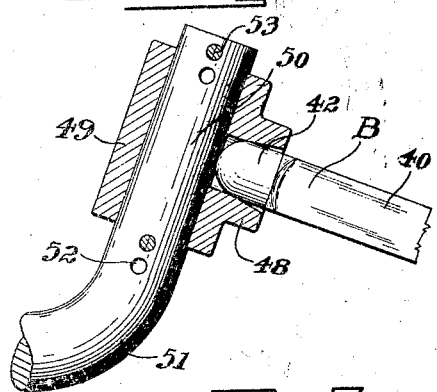
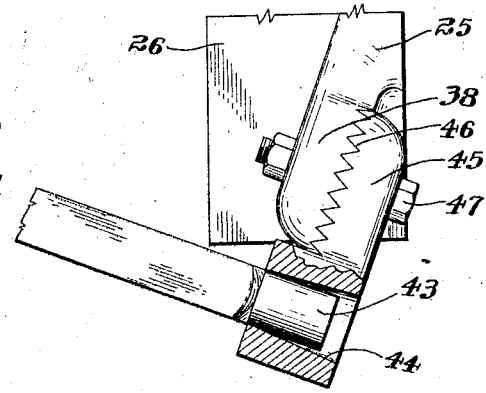
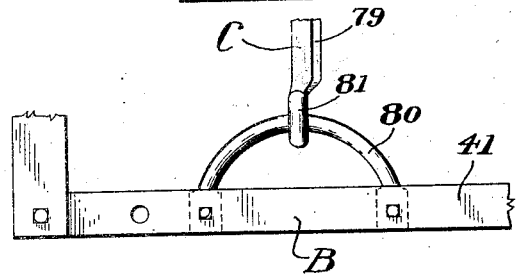
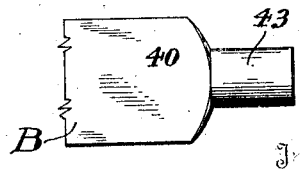

Patented Oct. 6, 1925.

1,556,173

UNITED STATES PATENT OFFICE.

JAY G. STEPHENSON, OF ATHENS, TENNESSEE, ASSIGNOR, BY MESNE ASSIGNMENTS, TO ATHENS PLOW COMPANY, A CORPORATION OF TENNESSEE.

TRACTOR PLOW.

Application filed October 7, 1921. Serial No. 506,123.

*To all whom it may concern:*

Be it known that I, JAY G. STEPHENSON, a citizen of the United States, residing at Athens, in the county of McMinn and State of Tennessee, have invented certain new and useful Improvements in Tractor Plows, of which the following is a specification.

This invention relates to tractor plows, and is an improvement on the plow device of my United States Patent #1,531,581, granted March 31, 1925, and the primary objects of the present invention are; first, to provide a novel means of associating the plow beam with the tractor frame, so as to render the device more compact and durable, said means also permitting the use of a relatively short rugged plow beam, whereby the likelihood of the beam becoming bent or strained during use is eliminated; second, to provide a novel means for associating the extension bar with the usual type of dead axle, said means permitting adjustment of the steering wheel carried by the extension bar in relation to the tractor and plows, whereby the width of the furrow cut can be readily regulated; and third, to provide a novel means for raising and lowering the plows and adjusting the plows in relation to the ground from the driver's seat.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation illustrating the means of associating the plow with the tractor.

Figure 2 is a plan view illustrating the means for connecting the plow with the tractor.

Figure 3 is a fragmentary front elevation of the dead axle of the tractor and the extension bar therefor, illustrating the means of associating said extension bar with the dead axle.

Figure 4 is a detail horizontal section through the dead axle and extension bar taken on the line 4—4 of Figure 3.

Figure 5 is an enlarged detail plan view partly in section illustrating the means of connecting the plow beam with the supporting beam of the device.

Figure 6 is a fragmentary plan view partly in section, illustrating the means of connecting the forward end of the plow beam with the extension of the dead axle.

Figure 7 is a fragmentary detail elevation of the means of connecting one of the plow supporting brackets with the adjusting and raising and lowering lever.

Figure 8 is a fragmentary side elevation of the plow beam showing one end thereof.

Figure 9 is a detail elevation of the attaching plate utilized for holding the supporting beam of the attachment to the frame or differential housing of the tractor.

Referring to the drawings in detail, wherein similar reference characters designate corresponding parts throughout the several views, the latter A indicates a tractor; and B, the plow associated therewith.

The tractor A may be of any preferred make, size or style, but as shown is of the "Fordson" type, and the same includes the front dead axle 10, the front steering wheels 11, and 12, the rear drive wheels 13 and 14, and the draw bar cap 15 carried by the rear end of the frame or differential housing 16. As shown the forward end of the differential housing 16 is provided with an attaching flange 17, which abuts the attaching flange 18 of the crank case 19 of the engine. Certain of the bolts 20, which are utilized for connecting the differential casing with the crank casing, can be used for another purpose, which will be hereinafter more apparent.

The front steering wheels 11 and 12 are rotatably mounted in the usual manner on stub axles or wheel spindles 21 and 22, which carry the usual rearwardly extending steering arms 23 and 24. As clearly shown in Figure 2 of the drawings, the front wheel 12 is extended laterally a further distance from the longitudinal medial line of the tractor than the steering wheel 11, and extends laterally beyond its rear tractor wheel 14, so as to allow the same to ride in a furrow previously plowed, and to permit the lateral extending of this wheel, an extension 25 is necessary for the ordinary dead axle 10. This wheel 12 is extended laterally in such a manner, so as to form a strong and rigid construction, and to allow the same to be adjusted in relation to the tractor and the plow mechanism B. This means will be hereinafter more fully described.

The means 25 includes a relatively long sleeve 26, in which is slidably mounted an extension bar 27, which can be held in any preferred adjusted position in relation to the sleeve by means of a set screw 28 carried by the sleeve, and which is adapted to impinge against the bar 27. It can be seen that in reality the sleeve 26 and the bar 27, form a single or unitary extension bar for the wheel, but for the sake of clearness one part has been designated as the sleeve and the other as the extension bar. The sleeve 26 is provided with pairs of inwardly extending spaced ears 29 and 30, which are adapted to embrace the upper and lower faces of the front dead axle 10. The ears 30 are provided with openings which are adapted to align with the usual spindle bolt bearing 31 on one end of the dead axle 10, and this bearing and the ears 30 receive a removable retaining bolt or the like 32. The ears 29 are apertured for the reception of a retaining bolt or the like 33. From this it can be seen that when the wheel 12 is to be extended laterally of its companion tractor wheel 14, the ordinary spindle bolt is removed from the spindle bolt bearing 31 and the extension bar placed in engagement with the end of the dead axle 10. This spindle bolt is then placed in a bearing 34, formed in the outer end of the bar 27. The ordinary steering arm connecting rod is also disconnected from the steering arm 24 when the wheel 12 is extended laterally, and an extension rod 36 is provided, which is pivotally connected with the steering arm 24, and to the ordinary connecting rod 35, by means of a clamp 37, which also permits an adjustment between the rod 35 and extension rod 36, as is readily apparent.

The upper face of the sleeve 26 adjacent to its outer end is provided with an upwardly extending diagonally disposed lug 38, the purpose of which will also be hereinafter more fully described.

The plow B includes a relatively short rugged plow beam 40, which is disposed at an angle to the longitudinal medial line of the tractor, at one side thereof, and as shown, extends approximately from the point of connection of the crank case housing and differential housing toward the extension bar or portion 25. The diagonal position of the plow beam 40 is of course, purely optional, providing the result intended by the invention can be obtained, and the attachment of this beam will probably vary according to the type of tractor being used. Its rear end attachment to the tractor frame by means of bearing 44, end 50 of beam 51, and plate 58, may be located substantially midway between the front and rear running gear, as by connecting flanges 17 and 18, or to other adjacent parts of the tractor frame intermediate the front and rear running gear, just so the short rugged beam 40 may be efficiently connected to the tractor frame without unduly lengthening the same. This beam 40 is preferably flattened throughout the major portion of its length, so as to permit the ready securing of the plow brackets 41 thereto. The terminals of the beam 40 are rounded, as at 42 and 43 to provide trunnions and the forward trunnion 43 is mounted for free rotary movement in a bearing 44, the bore of which can be flared outwardly if so desired. This bearing 44 has formed integral therewith a lug 45, which forms a companion to the lug 38. The lugs 38 and 45 are provided with meshing teeth 46 to prevent relative accidental movement therebetween, and these lugs are provided with axial openings for the reception of a pivot and retaining bolt 47. The rear trunnion 42 has its free end slightly rounded and mounted in a thrust bearing 48, the bore of which also can be tapered outwardly. This thrust bearing 48 is carried by a sleeve 49, which can be, if found desirable, mounted for rotary movement upon the inwardly extending angled end 50 of the supporting beam or rod 51. The angled end 50 of the supporting rod or beam 51 is provided with a plurality of openings 52, which are adapted to receive suitable cotter pins 53, for holding the sleeve 49 in an adjusted position on the angled end 50. It can be seen that the thrust bearing 48 and the sleeve 49 is in the nature of a T, and the plow beam 40 can readily be removed from the tractor by simply removing the bolt 47, and withdrawing the lug 45 from out of engagement with the lug 38, and the trunnion 42 out of the thrust bearing 48. The supporting rod or beam 51 extends longitudinally along the rear end of the tractor, and in parallel relation to the longitudinal medial line thereof, and the rear end of the supporting rod or beam is formed at right angles to said rod as at 55, and provided with an attaching foot 56, which can be bolted or otherwise secured, as at 57, to the ordinary draw bar cap 15. In order to effectively support the forward end of the supporting beam or bar 51, to hold the same against accidental movement, a bearing plate 58 is provided. The bearing plate 58 is provided with a bearing opening 59 for the reception of said supporting rod or beam. The inner end of the bearing plate 58 is shaped to conform to the configuration of the differential housing, and is provided with a plurality of openings 60, which are adapted to receive certain of the retaining bolts 20, utilized for bolting the flanges 17 and 18 of the differential housing 16 and crank case 19 together.

The plow supporting arms or brackets 41 are secured at spaced points to the plow beam 40, and it is to be understood that one or more of these arms can be provided, according to the size of the tractor, and the character of the ground being acted upon. These arms or brackets 41 have secured thereto in any preferred manner the plow discs 61, and these discs are extended at an angle to the path of movement of the tractor, as is usual. If desirable, scraper blades 62 can be provided for the plow discs 51, in order to prevent the adhering of lumps or clods thereto. A means C is provided for permitting the raising of the plow disc from out of engagement with the ground, and for lowering the plow disc into engagement with the ground and for holding the plow discs in various adjusted positions in relation to the ground, to regulate the depth of the furrows being made. This mechanism C includes a hand operated lever 70, which is pivoted intermediate its ends to a supporting standard 71, by means of a bolt 72. The lower end of this standard 71 is bolted or otherwise connected, as at 73, to the supporting rod or beam 51, and if found desirable, this standard can be braced by brace bars 74, which may extend to the differential housing. The upper end of the standard 71 has secured thereto a sector rack 75, which is adapted to be engaged by a suitable pawl mechanism 76. The rear end of the lever 70 is provided with a handle 77, which is positioned relatively near the operator's seat of the tractor, so that the plows can be readily regulated therefrom. The inner or forward end of the lever 70 has pivotally connected thereto, by means of a bolt 78, a connecting link 79, which extends downwardly toward one of the plow supporting arms or brackets 41. This arm or bracket 41 has connected thereto a bail 80, which is adapted to be engaged by an eye 81 formed on the lower end of the connecting link 79. The link 79 and the inner end of the lever 70 can be provided with a plurality of openings, in any of which the pivot bolt 78 is adapted to be placed. It can be seen that it is merely necessary to operate the lever 70, when it is desired to raise or lower the plow discs. If found desirable, the connecting rod 79 can be made in a pair of sections and adjustably connected together, so that the distance of the plow in relation to the lever 70 can be initially adjusted.

By the construction just described, it can be seen that an exceptionally simple and compact tractor plow has been provided, in which the use of a relatively short rugged plow beam is permitted, thereby absolutely precluding the possibility of the breaking or bending thereof.

This construction will also permit of the removal of the plow beam 40, and the plows 61, without necessitating the removal of the supporting beam 51 when the tractor is to be used for other purposes than plowing.

Now, it is also obvious that the means employed for mounting the plow beam 40 allows a relatively wide range of adjustment of the plow discs 61 in relation to the tractor body. It can be seen that the angle of the plow beam 40 can be varied by sliding the sleeve 49 along the angled end 50 of the supporting rod or beam 51. This sliding movement of the sleeve 49 is permitted by the flared bore of the bearing 44. Also the angle of the beam 40 in relation to the horizontal can be adjusted by swinging the lug 45 on its pivot bolt 47 in relation to the lug 38. This swinging movement is also permitted by the trunnion 42 in the flared bore of the thrust bearing 48. The adjustment of the steering wheel 12 also can be utilized for regulating the distance apart of the furrows previously plowed, and the furrows being plowed. In case very hard ground is being plowed it permits a less width of land to be cut by the plow disc, as it can be seen that if the steering wheel 12 is extended a less distance from the tractor body, the plow disc will be cutting a less width of soil. In some cases, of extremely hard ground, it might be necessary to plow with only one disc, in which case a different adjustment of the front steering wheel would be necessary. The plow discs 61 are so disposed that the forward disc will engage in the ground directly inwardly of the front steering wheel 12, which engages in the inner furrow previously plowed, while the inner disc 61 is disposed directly in front of its companion tractor wheel 14, which engages in the inner furrow being plowed. Thus, the tractor is held on its course and positively held against lateral shifting movement, which renders the tractor plow particularly adaptable for plowing hillsides. The plows being disposed intermediate the front and rear wheels allow the weight of the tractor to hold the same in the ground, and in case a hard object is struck, the rearing back of the tractor is absolutely precluded.

Changes in details may be made, without departing from the spirit or scope of this invention, but,

I claim:

1. A tractor plow comprising in combination an elongated frame, a pair of tractor wheels supporting said frame at one end and disposed at equi-distances and at opposite sides of the longitudinal axis thereof, a pair of steering wheels supporting the other end portion of said tractor, one of said wheels offset a greater distance from the longitudinal axis of the frame than the other of said steering wheels, and a plow beam carried by said frame and extending from substantially midway of the ends of the frame toward the forward end of the tractor and having a front supporting connection adjacent to the offset steering wheel.

2. A tractor plow comprising a frame, rear running gear for said frame, forward running gear for said frame including steering wheels which are unequally offset with respect to the longitudinal center of said frame, a plow beam diagonally supported by said tractor including means connecting the rear end thereof to said frame intermediate the front and rear running gear, and means connecting the forward end of said plow beam to the front running gear adjacent that steering wheel which is most distantly positioned with respect to the longitudinal center of the tractor frame.

3. A tractor plow comprising in combination a frame, front and rear ground wheels therefor, a plow beam disposed at an angle to the longitudinal axis of said frame, means for securing the forward end of said beam adjacent to a front wheel, a longitudinally extending supporting rod, means for securing the rear end of said rod to the rear end of the tractor frame and the forward end portion of said rod to the frame at a point adjacent the transverse center thereof, means for securing the rear end of said beam to the forward end portion of said supporting rod, and plows carried by said plow beam.

4. A tractor plow comprising in combination a frame including front ground wheels and a rear draw bar cap, a longitudinally extending supporting rod provided at its rear portion with an angularly extending attaching foot, means for securing said foot to said draw bar cap, means for securing the forward end portion of said supporting rod to the tractor frame, a plow beam disposed at an angle to the longitudinal axis of said frame, means for securing the forward end portion of said beam adjacent one of said front wheels, means for securing the rear portion of said beam to the forward portion of said supporting rod, and plows carried by said beam.

5. A tractor plow comprising in combination an elongated frame, a pair of tractor wheels supporting said frame at one end portion disposed at equal distances and on opposite sides of the longitudinal axis thereof, a front axle, a pair of steering wheels supporting the other end portion of the frame connected to said axle, one of said wheels being extended laterally a greater distance from the longitudinal axis of the frame than the other of said steering wheels, a draw bar cap carried by the rear end of the frame, a longitudinally extending supporting beam, a right angularly extending attaching foot formed on the rear end of the beam, means securing the attaching foot to the draw bar cap, an inwardly extending angled end formed on the forward end of the supporting beam, means for supporting the forward end of said supporting beam, a sleeve slidably mounted upon the angled forward end of the supporting beam, means for adjustably supporting the sleeve on said last mentioned angled end, a thrust bearing carried by said sleeve, a plow beam disposed at an angle to the longitudinal center of the frame having trunnions formed on the opposite ends thereof, one of said trunnions being mounted in said thrust bearing, a bearing sleeve carried by the axle adjacent to the extended steering wheel for supporting the other trunnion formed on the plow beam, plow discs secured to said beam, means for raising said beam including a supporting standard secured to said supporting beam, a lever pivotally secured intermediate its ends to said standard, a depending connecting link adjustably secured to the inner end of the lever, a bail carried by the plow beam, an eye formed on the lower end of said connecting link arranged to receive said bail, and means for detachably locking the lever with said standard.

6. A tractor plow including a frame, a front axle, a steering wheel carried by one end of the front axle, a sleeve detachably and rigidly secured to the opposite end of the axle, an extension bar adjustably mounted in said sleeve, a steering wheel secured to the free end of the extension bar, a diagonally extending plow beam, means for securing the forward end of the plow beam to the sleeve, means for securing the rear end of the plow beam to the frame, and plows carried by said beam.

7. In a tractor plow including a frame, a front axle, a steering wheel carried by one end of the front axle, a sleeve, a pair of inwardly extending lugs carried by the sleeve arranged to embrace the axle, the axle having a steering spindle bolt pin bearing formed thereon, one of said lugs being adapted to align with said bearing, a bolt extended through said bearing and lug, a solid extension bar slidably mounted in said sleeve, means for adjustably holding said bar in fixed relation to said sleeve, a steering wheel secured to the outer end of the extension bar, a lug formed on the sleeve, a diagonally extending plow beam, means rockably securing the forward end of the plow beam to the last mentioned lug, and means rockably securing the inner end of the plow beam to the frame.

8. As a new article of manufacture, a plow attachment for a tractor comprising a longitudinally extending supporting beam, an angled draw bar cap attaching foot formed on the rear end of said beam, an inwardly extending angled forward end for said beam, a diagonally extending plow beam rockably carried by the angled inner end of the supporting beam, a sleeve, an extension bar carried by the sleeve, means adjustably and rockably connecting the forward end of the beam to the sleeve, and plow discs secured to said beam.

9. As a new article of manufacture, a plow attachment for tractors comprising a supporting beam, a right angularly disposed plow draft bar cap attaching foot secured to the rear end of said beam, an inwardly extending angled end formed on the forward end of said beam, a diagonally extending plow beam, a sleeve mounted upon the forward angled end of said supporting beam, a thrust bearing carried by said sleeve having a tapered bore, an extension axle, an upwardly extending inclined ear formed on the upper portion of said extension axle, a second bearing having a tapered bore, an ear formed on said second bearing arranged to abut the first mentioned ear, the inner faces of said ears having meshing teeth formed thereon, a pivot bolt connecting said ears, plow brackets secured to said plow beams, and disc plows carried by said brackets.

10. In a tractor plow including a frame, a front axle, a steering wheel carried by one end of the front axle, an adjustable extension bar secured to the opposite end of the axle, a steering wheel for said adjustable extension bar, a plow beam, and means for securing the plow beam to the adjustable extension bar and frame.

11. A tractor plow comprising an elongated frame having a draw bar cap thereon, a pair of traction wheels supporting said frame at an end thereof disposed at equal distances at opposite sides of the longitudinal axis of the frame, a pair of steering wheels supporting the opposite end of the frame, one of said steering wheels being offset a greater distance from the longitudinal axis of the frame than the other of said steering wheels, a longitudinally extending supporting rod attached at its rear end to said draw bar cap, a plow beam supporting soil working devices intermediate of and inwardly of said traction and steering wheels, and means connecting said plow beam to the forward end of said longitudinally extending supporting rod.

12. A tractor plow comprising a frame, front and rear running gear for the frame, a supporting rod connected adjacent its ends to said tractor and extending substantially parallel of the longitudinal axis thereof, and a plow beam supported at its rear end by the supporting rod and at its forward end by the front running gear.

13. A tractor plow comprising a frame, tractor wheels supported at one end of said frame at equal distances on opposite sides of the longitudinal axis of the frame, steering wheels supporting said frame at the opposite end thereof arranged on opposite sides of the axis of the frame and at unequal distances from said longitudinal axis, a supporting member carried by said frame having a portion thereof extending forwardly of the tractor wheels and adjacent the frame of said tractor, and a diagonal plow beam supported at its rear end by the forward end of said member and at its forward end supported adjacent the steering wheel of the tractor most distantly positioned from the longitudinal center of the frame.

14. A tractor comprising a chassis which includes a frame, rear running gear for the frame, and front running gear for the frame including an axle with steering wheels at the ends thereof, a beam, means supporting the beam upon said frame of the chassis at a location on the frame substantially halfway between the front and rear running gear with the beam extending forwardly of said location towards an outer end of the axle of the front running gear, means connecting the forward end of the beam to said chassis adjacent a steering wheel of the front running gear, a plow, and means mounting the plow upon the beam between the front and rear running gear in bodily offset relation from said beam.

15. In a tractor plow a tractor chassis including front and rear running gear, a beam, means substantially horizontally connecting the beams to the chassis for rotation about the longitudinal axis of the beam, a plow, means connecting the plow on the beam between the front and rear running gear and offset from the axis of said beam, and means for rotating said beam to move the plow toward and away from the longitudinal axis of the tractor.

16. A tractor plow comprising a frame, rear running gear for the frame, front running gear for the frame including a frame supporting axle having a lateral extension offset more to one side of the frame than said axle extends to the other side of the frame, a beam, means supporting the beam at its rear end upon said frame at a location on the frame about midway between the front and rear running gear, means connecting the forward end of the beam to the axle of said front running gear at the lateral extension thereof, a plow disc, and a bracket arm connected with said beam intermediate its ends and at its outer end supporting said plow disc in bodily offset relation from said beam and at a location between the front and rear running gear.

17. In a tractor plow a chassis including front running and steering gear, rear running and traction gear, and a frame supported by said front and rear running gear including a crank case and differential housing having attaching flange means extending outwardly from the longitudinal axis of the tractor at a location substantially half way between the front and rear running gear, a beam, means connecting the beam to said attaching flange means at a side of the frame with the beam extending from said flange means forwardly toward the front running gear, means connecting said beam at its forward end to said chassis, and a plow supported by said beam between said connections of said beam.

JAY G. STEPHENSON.